(12) United States Patent
Graf et al.

(10) Patent No.: US 6,681,009 B1
(45) Date of Patent: Jan. 20, 2004

(54) SIGNALLING IN A TELECOMMUNICATION NETWORK

(75) Inventors: Leslie Graf, Melbourne (AU); Christian Groves, Keilor Victoria (AU); Juan Noguera-Rodriguez, Victoria (AU); Mark Hollis, Park Orchards (AU); Stephen Terrill, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/579,924

(22) Filed: May 26, 2000

(30) Foreign Application Priority Data

Jun. 23, 1999 (GB) .............................. 9914701

(51) Int. Cl.[7] .......................... H04M 7/00; H04L 12/56
(52) U.S. Cl. ..................................... 379/229; 370/395.1
(58) Field of Search ..................... 370/395.1–395.72, 370/522; 379/229, 220.01

(56) References Cited

U.S. PATENT DOCUMENTS 6,289,016 B1 * 9/2001 Subbiah et al. .......... 370/395.1
6,483,838 B1 * 11/2002 Ostman et al. ......... 370/395.31
6,507,567 B1 * 1/2003 Willars ....................... 370/321

FOREIGN PATENT DOCUMENTS

EP 0859527 2/1997

* cited by examiner

*Primary Examiner*—Ahmad F. Matar
*Assistant Examiner*—Hector Agdeppa
(74) *Attorney, Agent, or Firm*—Burns, Doane, Swecker & Mathis, L.L.P.

(57) ABSTRACT

A method of signalling in a telecommunications network comprises generating signalling messages at an Application Part or a User part of an originating signalling point, the messages having a maximum length of 272 octets. The generated signaling messages are transferred to a Message Transfer Part layer 3 (MTP3) of the originating signalling point, and on the basis of the destination signalling point of the received signalling message, it is determined whether or not the message is to be transmitted over an NNI-SAAL signalling link. If the message is to be transmitted over an NNI-SAAL signalling link, the message is transferred to an NNI-SAAL part of the originating signalling point. If the message is not to be transmitted over an NNI-SAAL signalling link, the message is transferred to an MTP2 part of the originating point.

4 Claims, 3 Drawing Sheets

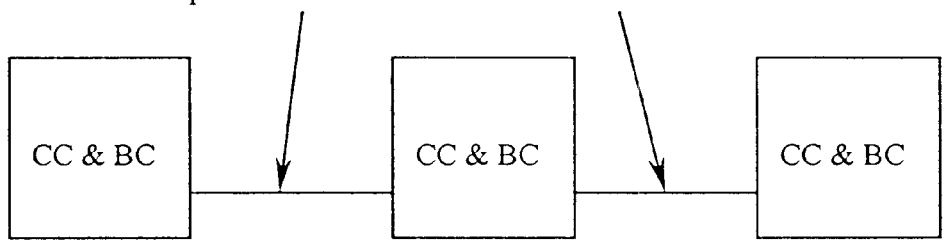

Current public networks' protocols (e.g. ISUP) perform simultaneous call and bearer control.

Figure 1a

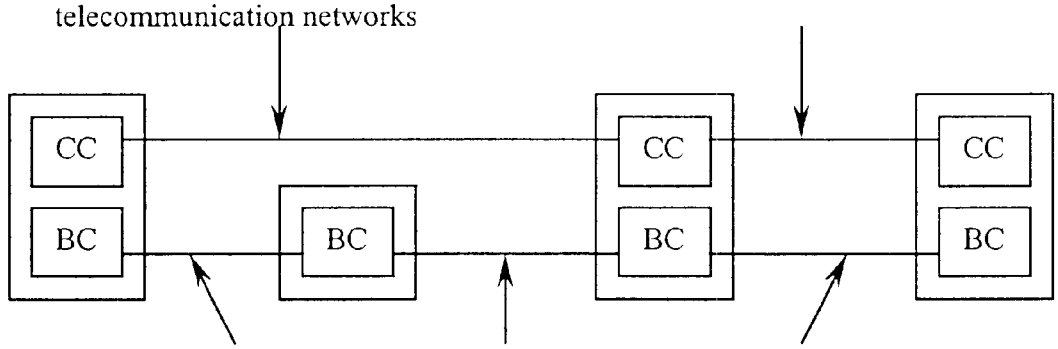

CC protocol independent of the underlying transport (bearer) technology. Provides the current set of single media services available in today's public telecommunication networks BC protocol specific to the transport technology deployed in these sections of the network (e.g. AAL1/2/5, IP, etc.).

Figure 1b

Stack supporting 272 octet message lengths
Stack supporting 4096 octet message lengths
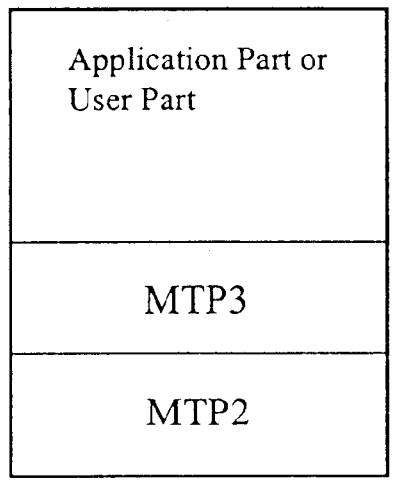
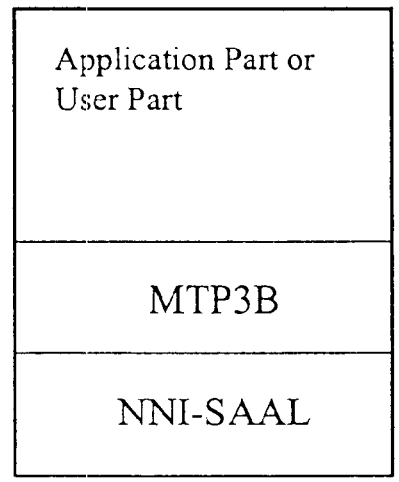
Figure 2
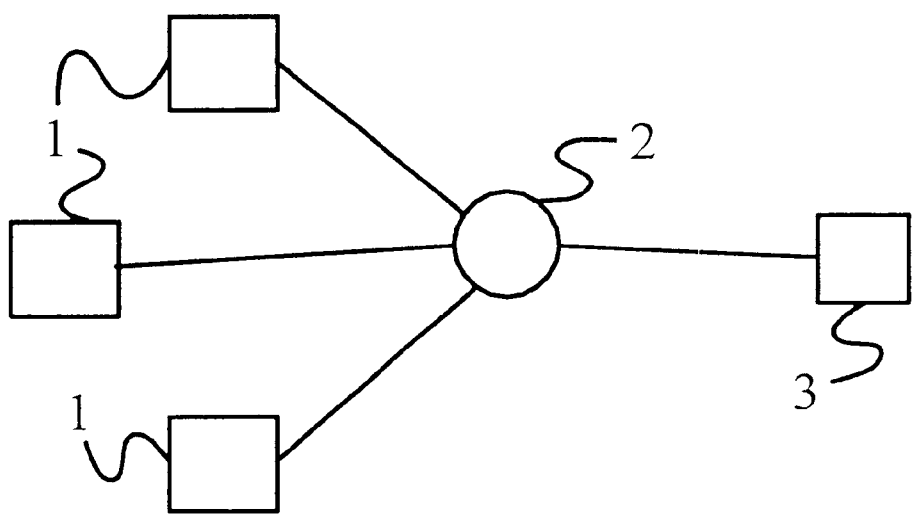
Figure 3

SIGNALLING IN A TELECOMMUNICATION NETWORK

BACKGROUND

This application claims priority under 35 U.S.C. §§119 and/or 365 to Application No. 9914701.9 filed in Great Britian on Jun. 23, 1999; the entire content of which is hereby incorporated by reference.

The present invention relates to signalling in a telecommunications network and in particular though not necessarily to ensuring the interworkability of future generation signalling networks with existing signalling networks.

Telecommunications networks currently rely to a large extent upon the Signalling System no. 7 (SS7) as the mechanism for controlling call connections and for handling the transfer of signalling information between signalling points of the networks. Typically, one or more Application and User Parts at a given signalling point will make use of SS7 to communicate with peer application and user parts at some other signalling point. Examples of User Parts are ISUP (ISDN User Part) and TUP (Telephony User Part) whilst examples of Application Parts are INAP (Intelligent Network Application Part) and MAP (Mobile Application Part). The conventional SS7 protocol stack includes Message Transfer Parts MTP1, MTP2, and MTP3 which handle the formatting of signalling messages for transport over the physical layer as well as various routing functions. The conventional physical transport network over which signalling messages are sent is a Synchronous Transfer Mode (STM) network such as E.1 (Europe) or T.1 (America). User plane data, e.g. voice information, is sent over the same STM network.

There has been considerable interest of late amongst the telecommunications community in using non-standard (i.e. non-conventional within the telecommunications industry) bearer transport mechanisms (non-STMs) in telecommunications networks for carrying user plane data. The reasons for this are related both to improvements in efficiency as well as potential cost savings. Much consideration has been given for example to the use of Asynchronous Transfer Mode (ATM) networks to transport signalling information between signalling points. The International Telecommunications Union (ITU) has recently defined a signalling protocol (specified in ITU-T Q.2630.1 and referred to hereinafter as Q.AAL2) for use in setting-up and controlling connections over ATM/AAL2 networks.

Typically, the bearer transport mechanism protocol layers lie beneath SS7, and ISUP, which deals with the setting-up and control of call connections, is closely linked to the bearer transport mechanism. ISUP therefore does not readily lend itself to use with non-STM bearer transport technologies such as AAL2. As such, several standardisation bodies including the ITU-T, ETSI, and ANSI, are currently considering the specification of a protocol for the control of calls, which is independent of the underlying bearer transport mechanism. This can be viewed as separating out from the protocol, bearer control functions which relate merely to establishing the parameters (including the start and end points) of the "pipe" via which user plane data is transported between nodes, and which are specific to the transport mechanism. The new protocol, referred to hereinafter as Transport Independent Call Control (TICC), retains call control functions such as the services invoked for a call between given calling and called parties (e.g. call forwarding), and the overall routing of user plane data. FIG. 1a illustrates the conventional integrated Call Control and Bearer Control structure of ISUP whilst FIG. 1b illustrates the proposed new separated structure.

The current version of Q.AAL2 is designed to be used with the so-called broadband MTP layer 3, referred to as MTP3B (specified in ITU-T Q.2210). Whereas the conventional MTP3 is designed to deal with signalling messages having a maximum length of 272 octets, MTP3B is designed to deal with signalling messages having a maximum length of 4096 octets. This capability of MTP3B arises from the capabilities of a Network Nodal Interface—Signalling ATM Adaptation Layer (NNI-SAAL—see ITU-T Q.2140) which replaces the conventional MTP2. FIG. 2 compares the conventional SS7 protocol stack (shown on the left side of the FIG.) with the modified stack (shown on the right side). MTP3B and NNI-SAAL additionally facilitate a much increased signalling message throughput (millions of bits per second as opposed to 64 thousand bits per second for the conventional system—hence the respective "broadband" and "narrowband" designations). In contrast to Q.AAL2, TICC is likely to specify a maximum signalling message length of 272 octets, i.e. in line with the message length restriction in conventional systems.

SUMMARY

It is desirable to be able to carry both TICC and Q.AAL2 signalling messages over the same physical signalling network. However, this is not possible if the Q.AAL2 signalling messages can exceed 272 octets in length. The inventors of the present invention therefore propose reducing the maximum possible length of Q.AAL2 signalling messages to 272 octets.

According to a first aspect of the present invention there is provided a method of setting up and controlling a user plane connection over a bearer transport mechanism using the Q.AAL2 signalling protocol, the method comprising restricting the maximum length of the Q.AAL2 signalling messages to 272 octets.

The inventors have further recognised that NNI-SAAL signalling links will desirably be introduced initially where signalling traffic is high. For example, an NNI-SAAL signalling link could advantageously be used to couple a Signalling Transfer Point (STP) to a network node which is accessed by many other nodes via the STP, i.e. where the STP concentrates signalling traffic onto the NNI-SAAL signalling link. However, so long as conventional MTP2 based networks exist, it is necessary to ensure that new network nodes have the ability to use MTP2 or NNI-SAAL depending upon the destination of signalling messages.

According to a second aspect of the present invention there is provided a method of signalling in a telecommunications network, the method comprising:

generating signalling messages at an Application Part or a User Part of an originating signalling point, the messages having a maximum length of 272 octets;

transferring the generated signalling messages to a Message Transfer Part layer 3 (MTP3) of the originating signalling point;

on the basis of the destination signalling point of the received signalling message, determining whether or not the message is to be transmitted over an NNI-SAAL signalling link; and if the message is to be transmitted over an NNI-SAAL signalling link, transferring the message to an NNI-SAAL part of the originating signalling point, and if the message is not to be transmitted over an NNI-SAAL signalling link, transferring the message to an MTP2 part of the originating signalling point.

Preferably, said Application Part or User Part is a Transport Independent Call Control User Part or a Q.AAL2 User Part.

In certain embodiments of the present invention, an Application Part or User Part may require signalling messages having a maximum length greater than 272 octets. It is possible to accommodate such a requirement by segmenting larger messages in the Application or User Part, and carrying out a reassembly process at the peer Part of the destination signalling point.

BRIEF DESCRIPTION OF THE DRAWINGS

FIG. 1a shows in block diagram form the architecture of a conventional telecommunications network;

FIG. 1b shows in block diagram form a network architecture in which the Call Control protocol is independent of the transport mechanism;

FIG. 2 illustrates the protocol stack of narrowband SS7 and broadband SS7;

FIG. 3 shows in block diagram form a part of a telecommunications network; and

DETAILED DESCRIPTION

Figure 4:
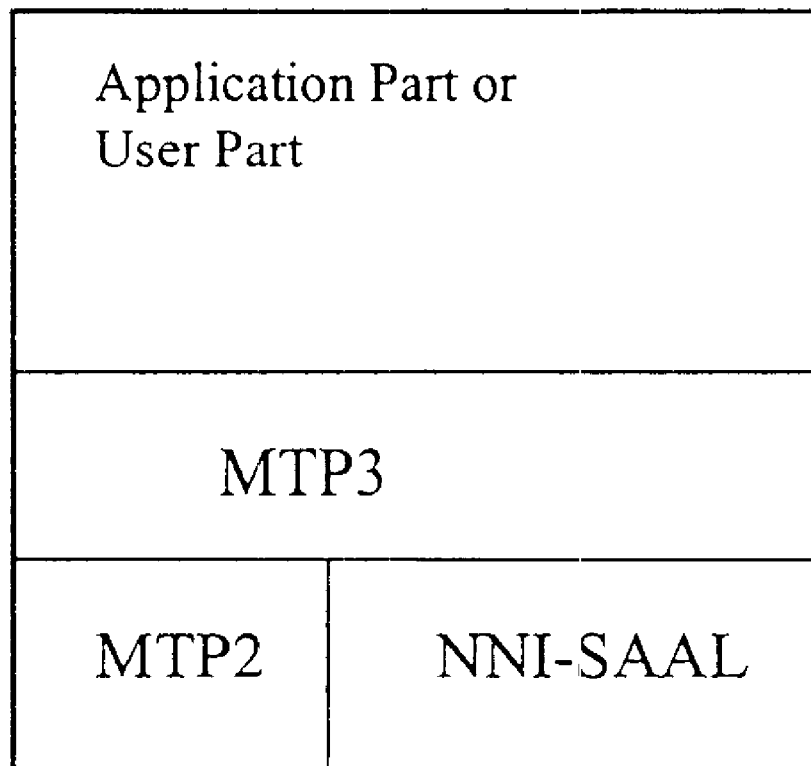
FIG. 4 illustrates a single protocol stack for use in both narrowband and broadband SS7 networks.

The proposed separation of the Call Control (CC) protocol and the Bearer Control (BC) protocol in future telecommunications standards, such as the Universal Mobile Telecommunications Standard (UMTS) has been described above with reference to FIGS. 1a and 1b. In addition, both narrowband and broadband SS7 protocol stacks have been described with reference to FIG. 2.

There is illustrated in FIG. 3 a part of a core network of a mobile telecommunications system. The core network comprises a number of Mobile Switching Centres (MSC/VLRs) 1 which control the routing of calls to and from mobile terminals currently registered with the network. When a call is made to a mobile terminal which is a subscriber of the illustrated network, the MSC/VLR 1 to which the call is connected must determine the status of that mobile terminal, i.e. whether the terminal is currently registered with the network, with some foreign network, or is not switched on. To do this, the MSC/VLR 1 transmits a Mobile Application Part (MAP) query to a Home Location Register (HLR) 2 of the network. Such queries are routed to the HLR 2 via a Signalling Transfer Point (STP) 3. Whilst the signalling links between the MSC/VLRs 1 and the STP 3 carry only a relatively low volume of signalling traffic, the link between the STP 3 and the HLR 2 must carry a relatively high volume of signalling traffic. It is preferred therefore that the latter link be a broadband link using NNI-SAAL.

Assuming that the STP 3 to HLR 2 link is an NNI-SAAP link, then it would be possible to facilitate communication between an MSC/VLR 1 and the HLR 2 by implementing the broadband stack shown on the right of FIG. 1 at both the MSC/VLR 1 and the HLR 2 (where the upper layer of the stack is MAP). However, it will be appreciated that it may be necessary for the same MAP at the MSC/VLR to communicate with other network nodes which do not use broadband SS7. For example, such a node may be an MSC/VLR of a foreign network.

In order to enable the interworking of the MAP at the MSC/VLR 1 with both broadband and norrowband SS7 supporting network nodes, a protocol stack such as is illustrated in FIG. 4 is implemented at the MSC/VLR 1 (as well as at other network nodes where interworking is required although the Application and User Parts would not be required at STPs where signalling messages are transferred transparently). The stack comprises, at the top, the Application and User Parts. These parts sit above a modified MTP3 layer which in turn sits above an MTP2 layer and an NNI-SAAL layer. Whilst the Application and User Parts, and the MTP2 and NNI-SAAL layers are substantially conventional, the MTP3 layer comprises additional functionality for routing a signalling message from an Application or User part to either the MTP3 or NNI-SAAL layer depending upon the destination signalling point of the signalling message. Typically, the MTP3 layer has access to information which indicates whether the MSC/VLR 1 is coupled to the destination signalling point via an NNI-SAAL link. If so, then the signalling message is passed to the NNI-SAAL layer for subsequent transmission over an ATM network. If the link between the MSC/VLR 1 and the destination signalling point does not utilise NNI-SAAL, then the message is passed from the MTP3 to the MTP2 layer, for subsequent transmission over a STM network.

In order for the protocol stack of FIG. 4 to function correctly, it is necessary that the Application and User Parts do not generate signalling messages which have a maximum length greater than 272 octets. Whilst NNI-SAAL is capable of handling larger messages (up to 4096 octets), MTP2 cannot handle messages larger than 272 octets. As the Application or User part from which a message originates does not whether the message will be transmitted via MTP2 of NNI-SAAL, it must ensure that the message length suits both, i.e. is 272 octets long or less. Whilst conventional Application and User parts such as ISUP and MAP already satisfy this requirement, it will be necessary to ensure that future standards such as TICC and Q.AAL2 also satisfy the requirement.

It will be appreciated by the person of skill in the art that various modifications may be made to the above described embodiment without departing from the scope of the present invention.

What is claimed is:

1. A method of setting up and controlling a user plane connection over a bearer transport mechanism using the Q.AAL2 signalling protocol, the method comprising restricting the maximum length of the Q.AAL2 signalling messages to 272 octets.

2. A method of signalling in a telecommunications network, the method comprising:

generating signalling messages at an Application Part or a User Part of an originating signalling point, the messages having a maximum length of 272 octets;

transferring the generated signalling message to a Message Transfer Part layer 3 of the originating signalling points;

on the basis of the destination signalling point of the received signalling message, determining whether or not the message is to be transmitted over an NNI-SAAL signalling point; and if the message is to be transmitted over an NNI-SAAL signalling link, transferring the message to an NNI-SAAL part of the originating signalling point, and if the message is not to be transmitted over an NNI-SAAL signalling link, transferring the message to an MTP2 part of the originating signalling point.

3. A method according to claim 2, wherein said Application Part or User Part is a Transport Independent Call Control User Part or a Q.AAL2 user part.

4. A method according to claim 2, wherein when an Application part or User Part requires signalling messages having a maximum length greater than 272 octets, larger messages are segmented in the Application or User Part, and a reassembly process is carried out at the peer Part of the destination signalling point.

* * * * *